(No Model.)
W. G. SCOTT.
PNEUMATIC DEVICE FOR TRANSMITTING POWER.
No. 399,789. Patented Mar. 19, 1889.
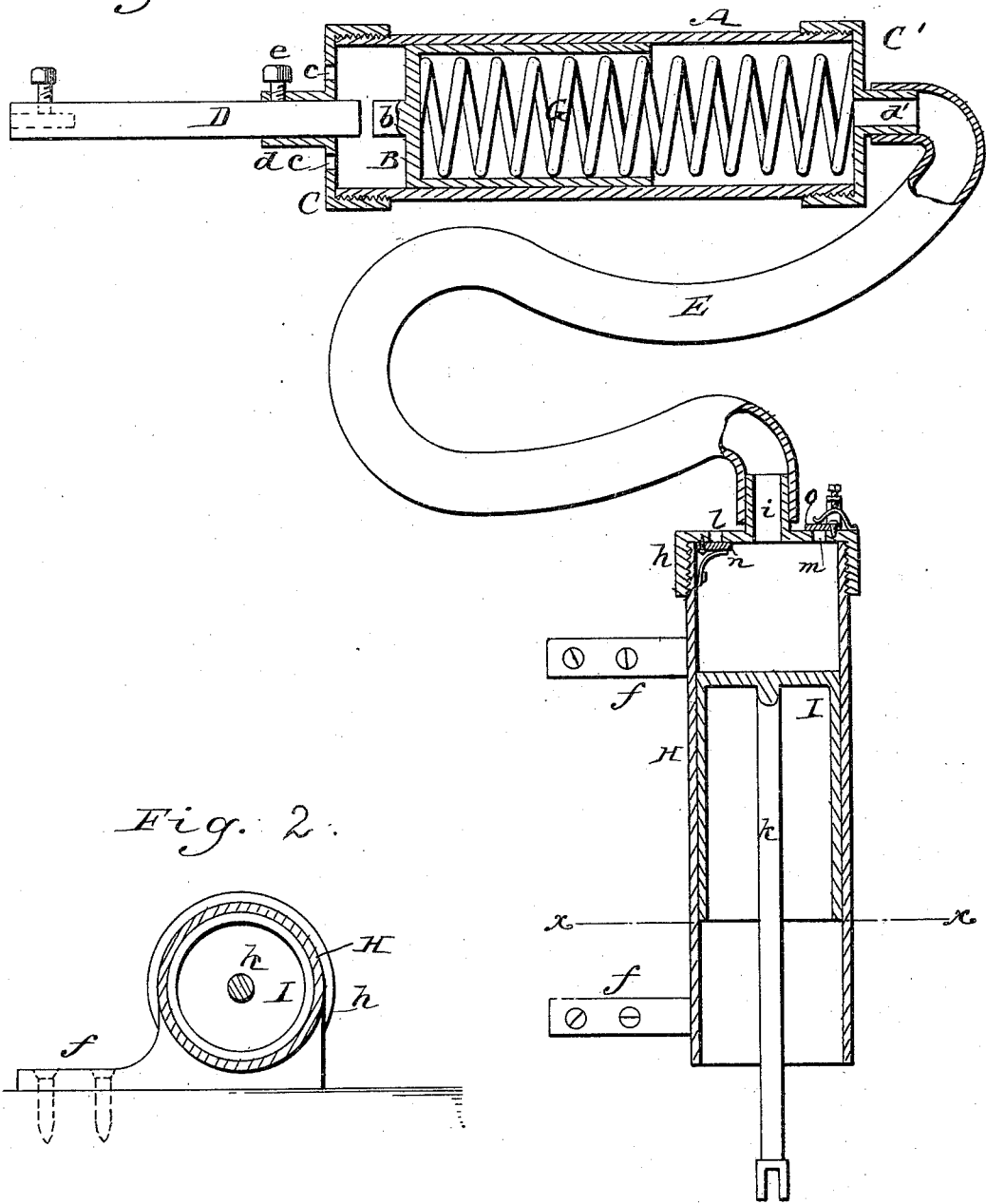

UNITED STATES PATENT OFFICE.

WILLIAM GIBSON SCOTT, OF STARKVILLE, MISSISSIPPI.

PNEUMATIC DEVICE FOR TRANSMITTING POWER.

SPECIFICATION forming part of Letters Patent No. 399,789, dated March 19, 1889.

Application filed August 6, 1888. Serial No. 282,069. (No model.)

*To all whom it may concern:*

Be it known that I, WILLIAM GIBSON SCOTT, of Starkville, in the county of Oktibbeha and State of Mississippi, have invented a new and useful Improvement in Pneumatic Devices for Transmitting Power, of which the following is a full, clear, and exact description.

This invention consists in a pneumatic apparatus of novel character and construction for transmitting power by blows or impact, substantially as hereinafter described, and pointed out in the claim.

While the invention is not restricted to any one precise object, but is applicable to various purposes or uses, it will here be described as used for imparting blows to a tool-holder, which will serve to give as good an illustration of its action as any other.

Reference is to be had to the accompanying drawings, forming a part of this specification, in which similar letters of reference indicate corresponding parts in both the figures.

Figure 1 represents a partially sectional longitudinal view of an apparatus embodying my invention, and Fig. 2 a transverse section upon the line $x\ x$ in Fig. 1.

A indicates a cylinder, which may be held in the hand or be otherwise loosely supported, and which is fitted internally with a free-working piston, B, having an attached solid head-piece, $b$, that acts as a hammer-head. The front end of said cylinder is closed by a screw-cap, C, having one or more air-apertures, $c$, and provided with an external socket-extension, $d$, within which and projecting through said cap is firmly held, as by a set-screw, $e$, the device to which the blow is to be imparted when the piston B is driven forward within the cylinder. This device is here represented as a bar, D, constructed to form a tool-holder, and as being in line with the head-piece $b$ on the front side of the piston B. The rear end of the cylinder A is similarly fitted with a screw-cap, C', having an external socket-extension, $d'$, the passage through which is extended through said cap. This socket-extension $d'$ serves to provide for the attachment thereto of the one end of a flexible tube or hose, E. Within the piston B and cylinder A is a spring, G, resting at its one end against the screw-cap C' and at its opposite end against the piston B, and serving to keep said piston in the forward end portion of the cylinder A.

H is an air-compressing cylinder having ears $f\,f$, by which it may be firmly secured in a fixed position, and which is closed at its one end by a screw-cap, $h$, having an external nozzle, $i$, to which the other end of the flexible tube or hose E is attached. This cylinder H is fitted with a piston, I, having an attached rod, $k$, that may be operated by crank or otherwise to reciprocate the piston, and the screw-cap $h$ is provided with an air-inlet aperture, $l$, and an outlet or relief aperture, $m$, closed, respectively, by valves $n$ and $o$, controlled by springs, which are preferably made adjustable. These valves serve to provide for the ingress and egress of air at suitable points in the operation of the pistons.

In the operation of the apparatus air received within the cylinder H through the aperture controlled by the valve $l$ is subsequently expelled by the piston I through the tube or hose E at a pressure controlled by the spring-closed valve $o$, and thus the power exerted upon the piston I is transmitted to the piston B of the cylinder A to cause the head-piece $b$ to strike the bar or blow-receiver D, which operation may be repeated at will, the force of the blow delivered by the piston B depending upon the length of the stroke of said piston.

If desired, the blow may be delivered toward what is here termed the "back end" of the cylinder A by removing the cap C and reversing the piston B and spring G. Furthermore, it is not essential that the bar D should be immovably connected by the set-screw $e$ with the cylinder A or its cap C, as in some cases it may be left free to slide therein, and said bar may be of any suitable construction at its outer end.

Having thus described my invention, what I claim as new, and desire to secure by Letters Patent, is—

In a pneumatic device for transmitting power, the combination, with a fixed air-compressing cylinder and its piston, of a loose cylinder, a flexible tube or hose connecting the latter in its rear with the fixed compressing-cylinder, a spring-controlled piston within the loose cylinder provided with a head-piece or hammer-head on its front face, a bar or device connected with the forward end of the loose cylinder and adapted to be struck by the head-piece of the piston in the loose cylinder, and spring-controlled air inlet and outlet valves applied to the compression end of the fixed cylinder, substantially as specified.

WM. GIBSON SCOTT.

Witnesses:
FRANK E. GOTTSEELIG,
W. H. TIPTON.